United States Patent
Shen et al.

(10) Patent No.: US 10,585,592 B2
(45) Date of Patent: Mar. 10, 2020

(54) DISK AREA ISOLATION METHOD AND DEVICE

(71) Applicant: Huawei Technologies Co., Ltd., Shenzhen (CN)

(72) Inventors: Jiangang Shen, Nanjing (CN); Yaohui Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 15/445,727

(22) Filed: Feb. 28, 2017

(65) Prior Publication Data
US 2017/0177220 A1 Jun. 22, 2017

Related U.S. Application Data

(63) Continuation of application No. PCT/CN2014/085634, filed on Aug. 30, 2014.

(51) Int. Cl.
*G06F 3/06* (2006.01)

(52) U.S. Cl.
CPC ............ *G06F 3/061* (2013.01); *G06F 3/0619* (2013.01); *G06F 3/0665* (2013.01); *G06F 3/0689* (2013.01)

(58) Field of Classification Search
CPC .......... G06F 3/06; G06F 3/061; G06F 3/0619; G06F 3/0655; G06F 3/0653
See application file for complete search history.

(56) References Cited

U.S. PATENT DOCUMENTS

| | | | | |
|---|---|---|---|---|
| 6,182,240 | B1 * | 1/2001 | Mine | G06F 3/0619 714/5.11 |
| 6,249,831 | B1 | 6/2001 | Allingham | |
| 2003/0149918 | A1 * | 8/2003 | Takaichi | G11B 20/18 714/42 |
| 2016/0005423 | A1 * | 1/2016 | Neppalli | G11B 5/09 360/25 |

FOREIGN PATENT DOCUMENTS

| | | |
|---|---|---|
| CN | 101276302 A | 10/2008 |
| CN | 103019623 A | 4/2013 |
| CN | 103488544 A | 1/2014 |
| CN | 103810062 A | 5/2014 |

* cited by examiner

*Primary Examiner* — Than Nguyen
(74) *Attorney, Agent, or Firm* — Leydig, Voit & Mayer, Ltd.

(57) ABSTRACT

Embodiments of the present disclosure provide a disk area isolation method, where the method includes: receiving, by a file system, a request for access to a file, where the access includes file reading or file writing; determining a to-be-accessed data block according to the request; accessing a physical area corresponding to the data block on a disk; identifying, according to a time consumed for accessing the physical area, whether the data block is located in a low-speed area on the disk; and isolating the data block that is identified to be located in the low-speed area.

14 Claims, 7 Drawing Sheets

DISK AREA ISOLATION METHOD AND DEVICE

CROSS-REFERENCE TO RELATED APPLICATIONS

This application is a continuation of International Application No. PCT/CN2014/085634, filed on Aug. 30, 2014, the disclosure of which is hereby incorporated by reference in its entirety.

TECHNICAL FIELD

The present disclosure relates to the field of communications technologies, and in particular, to a disk area isolation method and device.

BACKGROUND

A hard disk is comprised of one or more circular "disk sheets" (the disk sheet is made of a hard substance, such as aluminum, which is an origin of the word "hard disk"). A single side or double sides of the disk sheet is or are coated with a magnetic material, which is used to record data. Each side has a "read/write head" (which is also referred to as a magnetic head), which is used to check or modify the recorded data. The disk sheet rotates around an ordinary axis. Generally, a rotation speed is 3,600 rotations per minute, 7,200 rotations per minute, or the like. A hard disk with high performance has a higher rotation speed, which can even reach 15,000 rotations per minute. The read/write head moves along a radius of the disk sheet, and such a movement that goes with the rotation of the disk sheet enables the read/write head to access each part at a surface layer.

The surface layer is generally divided into a number of concentric circles, which are generally referred to as tracks, and these tracks are in turn successively divided into a number of sectors. Such division is used for specifying a location on the hard disk and allocating disk space to a file. To find a specific location, of the file, on a disk, it may be only required to point out, for example, "a surface layer 3, the fifth track, the seventh sector". Generally, sector numbers on all tracks are the same, but some hard disks have more sectors on an outer track (because all sectors have a same physical size, the outer track can contain more sectors). Generally, one sector can contain 512-byte data. The disk cannot process data whose byte count is less than a quantity of bytes in one sector.

Tracks and sectors at all surface layers are divided in a same manner, which means that when a magnetic head at a surface layer is located on a track, a magnetic head at another surface layer is located on a corresponding track. All gathered corresponding tracks are referred to as a cylinder. It takes time for the magnetic head to move from a track to another track. Therefore, frequently-accessed data needs to be placed together (such as a file), so that the frequently-accessed data is in a same cylinder. In this way, the magnetic head does not need to move around (which not only takes time, but also damages the magnetic head), so as to improve performance.

The disk belongs to a mechanical device, and as a usage time prolongs, situations such as a weakened read/write signal on a sector, a degenerated track, and a bad sector on a disk exist. When these situations occur, a read/write operation in the area becomes extremely slow, and a read/write delay substantially increases. In addition, these situations also results in that another normal IO request can only wait in a queue, which blocks the another normal IO request, causes degradation of overall performance of the disk, and makes the disk become a slow disk. The slow disk refers to a disk that has relatively low performance in a storage system.

In the prior art, a manner of slow disk detection and isolation is generally used to resolve the foregoing problems. Currently, slow disk detection is generally performed on a disk device by a device manufacturer. A used algorithm is generally as follows: A threshold is set according to an application; for example, for an IPTV service that is extremely delay-sensitive, it is considered to be slow when one IO whose latency exceeds 300 ms; when over 50 times of IO whose latency exceeds 300 ms occurs within 300 s, the disk is considered as a slow disk, and the entire disk is isolated. Because the entire disk is isolated, other good areas on the disk cannot be used, which causes a great waste.

SUMMARY

Embodiments of the present disclosure provide a disk area isolation method and device, so as to increase a utilization rate of a disk.

According to a first aspect, an embodiment of the present disclosure provides a disk area isolation method, where the method is applied to a file system, the file system stores a file in a unit of data block, each data block has a corresponding physical area on a disk, and the method includes:

receiving, by the file system, a request for access to a file, where the access includes file reading or file writing;

determining a to-be-accessed data block according to the request;

accessing a physical area corresponding to the data block on the disk;

identifying, according to a time consumed for accessing the physical area, whether the data block is located in a low-speed area on the disk; and isolating the data block that is identified to be located in the low-speed area.

In a first possible implementation manner of the first aspect, the file system records an average time consumed for accessing the disk, and the identifying, according to a time consumed for accessing the physical area, whether the data block is located in a low-speed area on the disk includes:

acquiring the recorded average time consumed for accessing the disk;

calculating a ratio of the time consumed for accessing the physical area to the average time consumed for accessing the disk; and comparing the ratio with a time consumption threshold preset in the file system, where if the ratio is greater than the time consumption threshold, the data block is located in the low-speed area on the disk; or if the ratio is less than the time consumption threshold, the data block is not located in the low-speed area on the disk.

With reference to the first aspect or the first possible implementation manner of the first aspect, in a second possible implementation manner of the first aspect, the file system includes a data structure that is used to describe logical partitioning of the disk, and the data structure includes an isolation block and a data area, where the isolation block is used to record a block number of an isolated data block; and the data area includes a data block used for file storage.

With reference to the second possible implementation manner of the first aspect, in a third possible implementation manner of the first aspect, the isolating, by the file system, the data block that is identified to be located in the low-speed area includes:

recording, by the file system in the isolation block, a block number of the data block that is identified to be located in the low-speed area;

after subsequent access to the data block is received, determining whether the isolation block records the block number of the data block; and after determining that the isolation block already records the block number of the data block, denying the subsequent access to the data block.

With reference to the second or the third possible implementation manner of the first aspect, in a fourth possible implementation manner of the first aspect, the data structure further includes a metadata area, where the metadata area includes an index node that is used for recording metadata of a file, where each file is corresponding to one index node;

the isolating, by the file system, the data block that is identified to be located in the low-speed area further includes:

setting a slow disk tag in an index node of the file, where the slow disk tag is used to indicate that the file occupies the data block that is located in the low-speed area on the disk; and before the determining whether the isolation block records the block number of the data block, the method further includes:

determining that the slow disk tag is set in the index node of the file.

With reference to the second to the fourth possible implementation manners of the first aspect, in a fifth possible implementation manner of the first aspect, the data structure further includes a superblock, where the superblock records the average time consumed for accessing the disk and the quantity of times the disk is accessed, and the superblock further records start addresses of the isolation block, the data area, and the metadata area, and a size of a data block.

With reference to the first aspect or the first to the fifth possible implementation manners of the first aspect, in a sixth possible implementation manner of the first aspect, when the access is file reading, the determining, by the file system, a to-be-accessed data block according to the request includes: determining, by the file system, the to-be-accessed data block based on a location of to-be-read data in the file and the size of the data block.

With reference to the first aspect or the first to the fifth possible implementation manners of the first aspect, in a seventh possible implementation manner of the first aspect, when the access is file writing, the determining, by the file system, a to-be-accessed data block according to the request includes:

determining, by the file system according to the request, whether a new data block needs to be allocated; and if a new data block needs to be allocated, allocating, by the file system, a new data block to the file with skipping the isolated data block, and determining the new data block as the to-be-accessed data block; or if a new data block does not need to be allocated, determining, by the file system, the to-be-accessed data block based on a write location in the file and the size of the data block.

According to a second aspect, an embodiment of the present disclosure provides a disk area isolation device, where the device includes a file system, the file system stores a file in a unit of data block, the data block is a logical block partitioned by the file system on a disk, each data block has a corresponding physical area on the disk, and the file system includes:

a receiving module, configured to receive a request for access to a file, where the access includes file reading or file writing; and a processing module, configured to: determine a to-be-accessed data block according to the request; access a physical area corresponding to the data block on the disk; identify, according to a time consumed for accessing the physical area, whether the data block is located in a low-speed area on the disk; and isolate the data block that is identified to be located in the low-speed area.

In a first possible implementation manner of the second aspect, the processing module is further configured to record an average time consumed for accessing the disk; and that the processing module identifies, according to the time consumed for accessing the physical area, whether the data block is located in the low-speed area on the disk includes:

acquiring, by the processing module, the recorded average time consumed for accessing the disk; calculating a ratio of the time consumed for accessing the physical area to the average time consumed for accessing the disk; and comparing the ratio with a time consumption threshold preset in the file system, where if the ratio is greater than the time consumption threshold, the data block is located in the low-speed area on the disk; or if the ratio is less than the time consumption threshold, the data block is not located in the low-speed area on the disk.

With reference to the first possible implementation manner of the second aspect, in a second possible implementation manner of the second aspect, the processing module is further configured to: when the data block is not located in the low-speed area on the disk, update the recorded average time consumed for accessing the disk.

With reference to the second aspect or the first to the second possible implementation manners of the second aspect, in a third possible implementation manner of the second aspect, the file system includes a data structure that is used to describe logical partitioning of the disk, and the data structure includes an isolation block and a data area, where the isolation block is used to record a block number of an isolated data block; and the data area includes a data block used for file storage.

With reference to the third possible implementation manner of the second aspect, in a fourth possible implementation manner of the second aspect, that the processing module isolates the data block that is identified to be located in the low-speed area includes:

recording, by the processing module in the isolation block, a block number of the data block that is identified to be located in the low-speed area; after subsequent access to the data block is received, determining whether the isolation block records the block number of the data block; and after determining that the isolation block already records the block number of the data block, denying the subsequent access to the data block.

With reference to the third to the fourth possible implementation manners of the second aspect, in a fifth possible implementation manner of the second aspect, the data structure further includes a metadata area, where the metadata area includes an index node that is used for recording metadata in a file, where each file is corresponding to one index node;

that the processing module isolates the data block that is identified to be located in the low-speed area further includes: setting, by the processing module, a slow disk tag in an index node of the file, where the slow disk tag is used to indicate that the file occupies the data block that is located in the low-speed area on the disk; and before that the processing module determines whether the isolation block records the block number of the data block, the following is further included: determining, by the processing module, that the slow disk tag is set in the index node of the file.

With reference to the third to the fifth possible implementation manners of the second aspect, in a sixth possible implementation manner of the second aspect, the data structure further includes a superblock, where the superblock records the average time consumed for accessing the disk and the quantity of times the disk is accessed, and the superblock further records start addresses of the isolation block, the data area, and the metadata area, and a size of a data block.

With reference to the second aspect or the first to the sixth possible implementation manners of the second aspect, in a seventh possible implementation manner of the second aspect, when the access is file reading, that the processing module determines the to-be-accessed data block according to the request includes: determining, by the processing module, the to-be-accessed data block based on a location of to-be-read data in the file and the size of the data block.

With reference to the second aspect or the first to the sixth possible implementation manners of the second aspect, in an eighth possible implementation manner of the second aspect, when the access is file writing, that the processing module determines the to-be-accessed data block according to the request includes:

determining, by the processing module according to the request, whether a new data block needs to be allocated; and if a new data block needs to be allocated, allocating, by the file system, a new data block to the file with skipping the isolated data block, and determining the new data block as the to-be-accessed data block; or if a new data block does not need to be allocated, determining, by the processing module, the to-be-accessed data block based on a write location in the file.

In the foregoing embodiments, a data block is isolated in a file system, which avoids access to an area with low performance on a disk, and does not affect access to an area with normal performance on the disk, thereby increasing a utilization rate of the disk.

DESCRIPTION OF EMBODIMENTS

Figure 1:
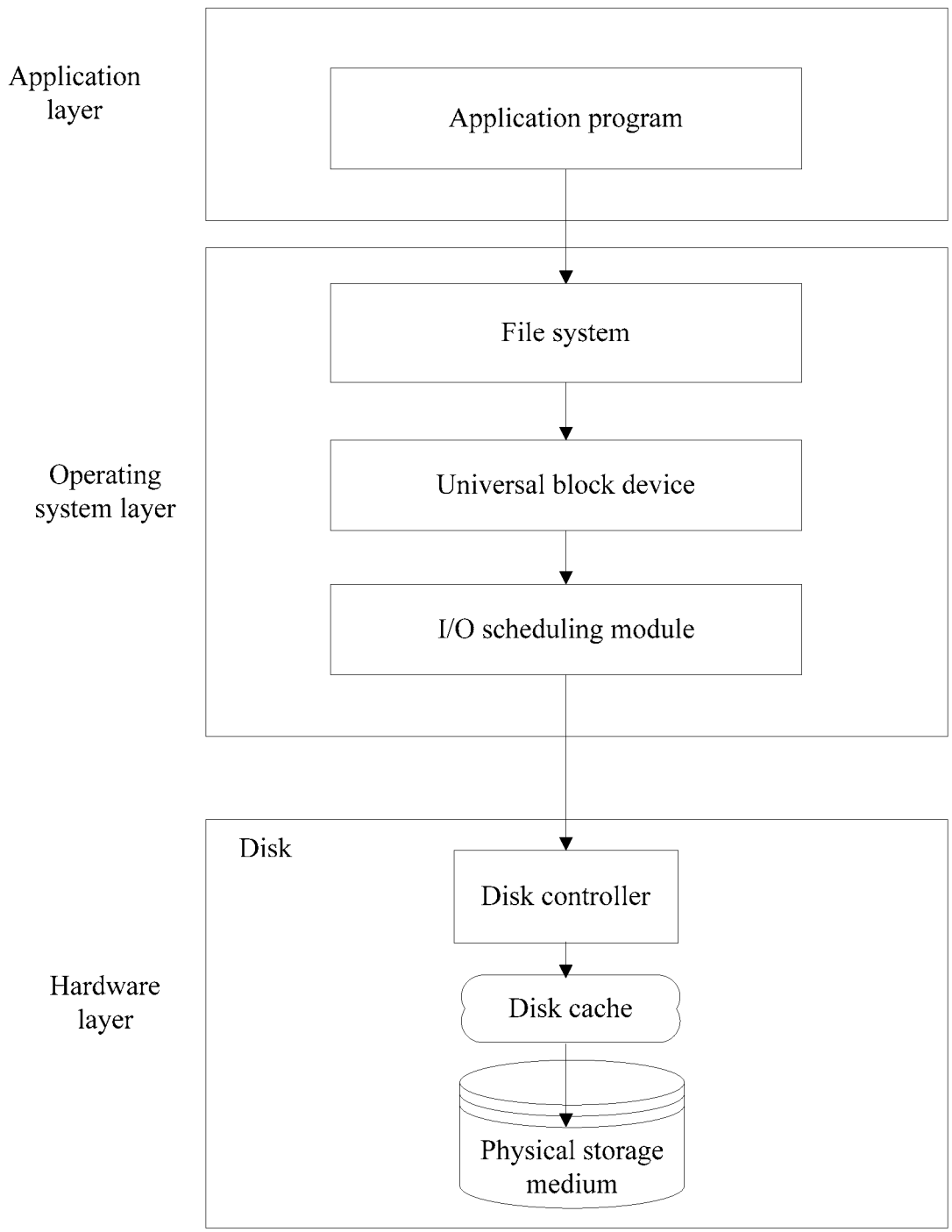
FIG. 1 is an architectural diagram of a system applicable to a disk isolation technology according to an embodiment of the present disclosure.

FIG. 1 is an architectural diagram of a system applicable to a disk isolation technology according to an embodiment of the present disclosure. As shown in FIG. 1, the system includes an application layer, an operating system layer, and a hardware layer.

The hardware layer is a disk. The disk may be a hard disk such as a Serial Advanced Technology Attachment (SATA) hard disk, a serial attached SCSI (SAS) hard disk, or a solid state disk (SSD), or may be an optical disc, a floppy disk, or the like. Generally, the disk may include a physical storage medium, a disk cache, and a disk controller. The disk controller is configured to control writing of data into the physical storage medium, or reading of data from the physical storage medium. The cache on the disk is mainly for improving storage and access performance.

Figure 2:
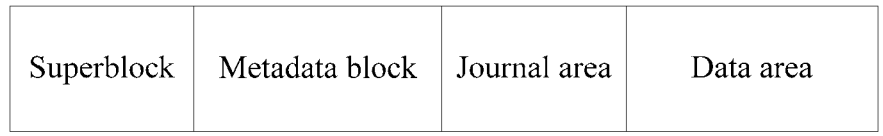
FIG. 2 is a schematic diagram of a data structure in a file system on a UNIX operating system.

The operating system layer includes a file system (FS), a universal block device, and an input/output (I/O) scheduling module. The file system is a method and a data structure that are used for determining a file on a disk by an operating system, that is, the file system is a method for organizing files on a disk. The file system can perform logical partitioning on the disk, and use a particular data structure to describe the logical partitioning of the disk. For example, FIG. 2 is a schematic diagram of a data structure in a file system on a UNIX operating system. As shown in FIG. 2, in the file system on the UNIX operating system, a data structure describing logical partitioning of a disk may include a superblock "superblock", a metadata area "Metadata", a journal area "Journal", and a data area "data block". The superblock is used to record overall information about the file system, such as a size of the file system and a start address of each area (such as the metadata area, the journal area, and the data area). The metadata area is used to record an index node "inode", which is also referred to as an i node. The index node is used to manage and store attributes of a file, for example, the index node records a size, an ownership and a latest modification time of the file. These attributes are referred to as metadata of the file. One file is managed by one index node. The data area is comprised of data blocks and used to store file content.

The application layer includes an application (APP).

When the APP at the application layer invokes an interface of the file system at the operating system layer to access a file, the file system delivers the access operation to the disk controller at the hardware layer by using the universal block device and the I/O scheduling module. After receiving the access operation from the I/O scheduling module, the disk controller accesses the physical storage medium of the disk. The universal block device is responsible for translating an accessed logical area into a physical area on the disk. The I/O scheduling module controls, by using a scheduling algorithm, a time and an order of the delivery of the access operation to the hardware layer.

In the prior art, slow disk detection and isolation are generally implemented on the disk controller at the hardware layer. Because the disk controller has limited storage space, and cannot perform complex data recording and processing, the disk controller can only isolate an entire slow disk.

Different from the prior art, a slow disk detection and isolation technology provided in embodiments of the present disclosure is implemented in the file system at the operating system layer, and isolation can be performed in a unit of data block, so that area isolation for the disk is implemented, and a utilization rate of the disk is increased. With reference to the accompanying drawings, the following describes in detail a method provided in the embodiments of the present disclosure.

Figure 3:
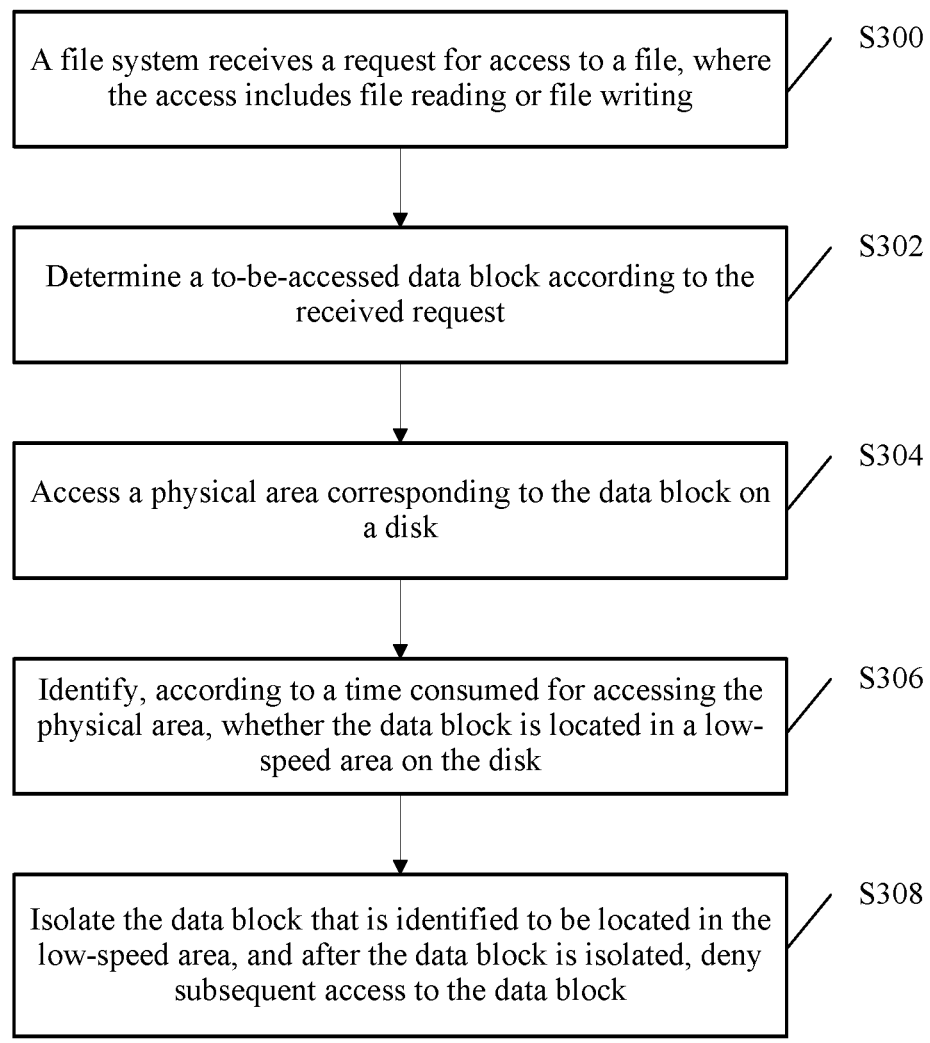
FIG. 3 is a flowchart of a disk area isolation method according to an embodiment of the present disclosure.

FIG. 3 is a flowchart of a disk area isolation method according to an embodiment of the present disclosure. The method is applied to a file system, and as shown in FIG. 3, the method includes the following steps:

S300. The file system receives a request for access to a file, where the access includes file reading or file writing.

The file system stores a file in a unit of data block, the data block is a logical block of a disk in the file system, and each data block has a corresponding physical area on the disk. One file can be stored in one or more data blocks.

The file system can provide an interface for operating a file, and an APP at an application layer may send, to the file system by using the interface, a request for access to a file. The request generally includes an operation type of the access (for example, a read operation or a write operation), and may further include a location of to-be-accessed data in the file (for example, the first 200-byte data of the file is to be accessed).

S302. The file system determines a to-be-accessed data block according to the received request.

The file system may determine the to-be-accessed data block according to a location, in the file, of data to which access is requested.

S304. The file system accesses a physical area corresponding to the data block on a disk.

After determining the to-be-accessed data block, the file system translates the to-be-accessed data block into the corresponding physical area on the disk by using a universal block device, and delivers the access operation to a disk controller by using an I/O scheduling module. The disk controller accesses the physical area.

S306. The file system identifies, according to a time consumed for accessing the physical area, whether the data block is located in a low-speed area on the disk.

S308. The file system isolates the data block that is identified to be located in the low-speed area.

In this embodiment of the present disclosure, a data block is isolated in a file system, which avoids access to an area with low performance on a disk, and does not affect access to an area with normal performance on the disk, thereby increasing a utilization rate of the disk.

In addition, because disk area isolation is implemented in the file system in this embodiment of the present disclosure, a request for access to a low-speed disk area can be directly denied at a file system layer, thereby preventing the request for the access to the low-speed disk area being delivered to a disk controller again, and saving system resources.

The access to the file in the foregoing embodiment may be a file reading operation or a file writing operation. During file writing, whether new disk space is allocated is involved. Therefore, for file reading and file writing, processing in step S302 is different.

Specifically, when the access in S300 is file reading, S302 specifically includes: determining, by the file system, the to-be-accessed data block based on a location of to-be-read data in the file and a size of a data block. For example, assuming that the data to which access is requested is the first 200 bytes of the file, the size of the data block is 240 bytes, and the file is successively stored in three data blocks whose block numbers are 7, 8, and 9, the currently to-be-accessed data block is the data block whose block number is 7.

When the access in S300 is file writing, S302 specifically includes: determining, by the file system according to the request, whether a new data block needs to be allocated; and if a new data block needs to be allocated, allocating, by the file system, a new data block to the file with skipping the isolated data block, and determining the new data block as the to-be-accessed data block; or if a new data block does not need to be allocated, determining, by the file system, the to-be-accessed data block based on a write location in the file and a size of a data block.

It should be noted that, in a disk isolation technology, it is required to rely on a disk detection technology to identify a low-speed area on a disk. However, in this embodiment of the present disclosure, disk detection is implemented in step S306. S306 may be implemented by using an existing disk detection algorithm, or may be implemented by using an improved algorithm provided in this embodiment of the present disclosure. In the prior art, a slow disk is generally determined in a manner of collecting statistics about single I/O without distinguishing whether each I/O access is performed in a different area. Therefore, when consecutive bad sectors are read and written, erroneous detection and erroneous determining are easily caused, and detection accuracy is affected. In this embodiment of the present disclosure, the existing detection algorithm is improved, and a detection algorithm with higher accuracy is provided. Specifically, in this embodiment of the present disclosure, when the file system records an average time consumed for accessing the disk, a detection process in step S306 specifically includes:

acquiring, by the file system, the recorded average time consumed for accessing the disk;

calculating a ratio of the time consumed for accessing the physical area to the average time consumed for accessing the disk; and comparing the ratio with a time consumption threshold preset in the file system, where if the ratio is greater than the time consumption threshold, the data block is located in the low-speed area on the disk; or if the ratio is less than the time consumption threshold, the data block is not located in the low-speed area on the disk.

In the foregoing embodiment, the low-speed area on the disk is determined by using the ratio of the time consumed for current access to the average time consumed for accessing the disk, thereby improving detection accuracy.

It should be noted that, when the data block is not located in the low-speed area on the disk, the file system needs to update the recorded average time consumed for accessing the disk. A quantity of times the disk is accessed needs to be used in an updating algorithm. Therefore, the file system further needs to record the quantity of times the disk is accessed. That the file system updates the recorded average time consumed for accessing the disk specifically includes:

calculating, by using a formula acctme(new)=(acctime(sb)*ion(sb)+acctime(file block))/(ion(sb)+1), an average time consumed for accessing the disk, where acctme(new) is the latest average time consumed for accessing the disk that is obtained by means of calculation, acctime(sb) is the average time consumed for accessing the disk that is recorded in the file system, ion(sb) is the quantity of times the disk is accessed that is recorded in the file system, and acctime(file block) is the time consumed for currently accessing the physical area; and updating, by the file system, the recorded average time consumed for accessing the disk to the average time consumed for accessing the disk that is obtained by means of calculation.

It should be noted that, the quantity of access times that is recorded in the file system may be in real time, or may be a preset fixed value. For example, if situations of only last 10 times of access are considered during calculation of the average time consumed for accessing the disk, the quantity of times the disk is accessed may be set to nine. If the quantity of access times is in real time, each time the average time consumed for accessing the disk is updated, the file system increases the recorded quantity of times the disk is accessed by one, so that the quantity of times the disk is accessed is used next time in calculation of the average time consumed for accessing the disk. It should be noted that, because access to the low-speed area on the disk is abnormal access, when the current access is access to the low-speed area on the disk, the average time consumed for accessing the disk and the quantity of times the disk is access may not be updated.

Figure 4:
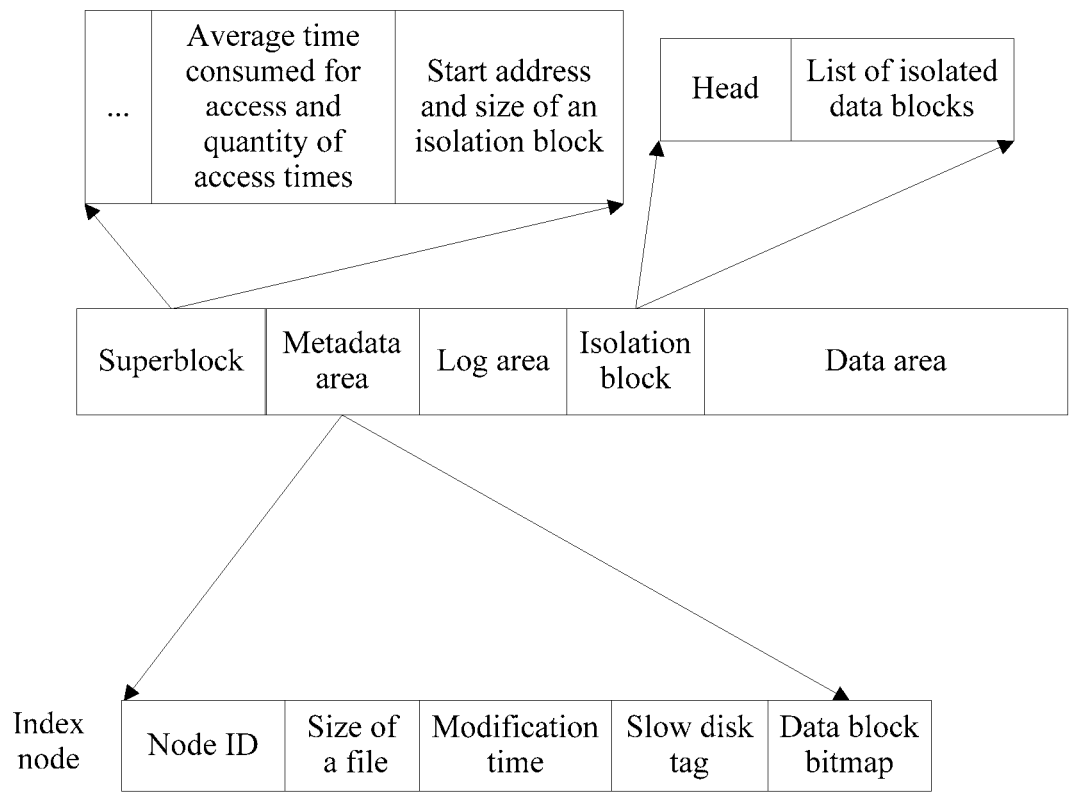
FIG. 4 is a schematic diagram of a data structure in a file system according to an embodiment of the present disclosure.

The following describes in detail the solutions in the present disclosure by using a UNIX file system as an example. As shown in FIG. 4, FIG. 4 is a schematic diagram of a data structure in a file system according to an embodiment of the present disclosure. On a basis of the data structure shown in FIG. 2, an isolation block is added to the data structure shown in FIG. 4. In this embodiment of the present disclosure, the isolation block is a new area used to record a block number of an isolated data block. In specific implementation, the isolation block may include two parts: a header "Header" and a block list "Block list". The "Header" includes overall information about the isolation block, such as an area size of the isolation block and a size of a used part of the isolation block. The "Block list" records a block number of a data block that needs to be isolated, and may generally be managed by using a B+tree or a bitmap.

In addition to the newly-added isolation block, the data structure shown in FIG. 4 may further include the superblock, the metadata area, and the data area in the data structure shown in FIG. 2. In this embodiment of the present disclosure, a record of a start address and a size of the isolation block is further added to the superblock, and the average time consumed for accessing the disk and the quantity of times the disk is accessed are recorded in the superblock.

Based on the data structure shown in FIG. 4, step 308 may be specifically implemented in the following manners:

The isolating, by the file system, the data block that is identified to be located in the low-speed area specifically includes: recording, by the file system in the isolation block, a block number of the data block that is identified to be located in the low-speed area; and after subsequent access to the data block is received, determining, by the file system, whether the isolation block records the block number of the data block; and after determining that the isolation block already records the block number of the data block, denying the subsequent access to the data block.

To further improve access efficiency, the metadata area may be further expanded in this embodiment of the present disclosure. The isolating, by the file system, the data block that is identified to be located in the low-speed area further includes: setting a slow disk tag in an index node of the accessed file, where the slow disk tag is used to indicate that the file occupies the data block that is located in the low-speed area on the disk; and before the determining whether the isolation block records the block number of the data block, further determining, by the file system, that the slow disk tag is set in the index node of the file.

In the foregoing manners, searching the isolation block for the block number of to-be-accessed data block can be reduced, thereby reducing access time and saving system resources.

The data structure shown in FIG. 4 may further include the journal area in the data structure shown in FIG. 2 or another logical block in the prior art. Because an improvement to the another logical block is not involved in this embodiment of the present disclosure, details are not described herein. It should be noted that, the data structure shown in FIG. 4 is described by using the UNIX file system as the example, and in a file system on another operating system, reference may also be made to the foregoing embodiment to implement a same function.

Figure 5:
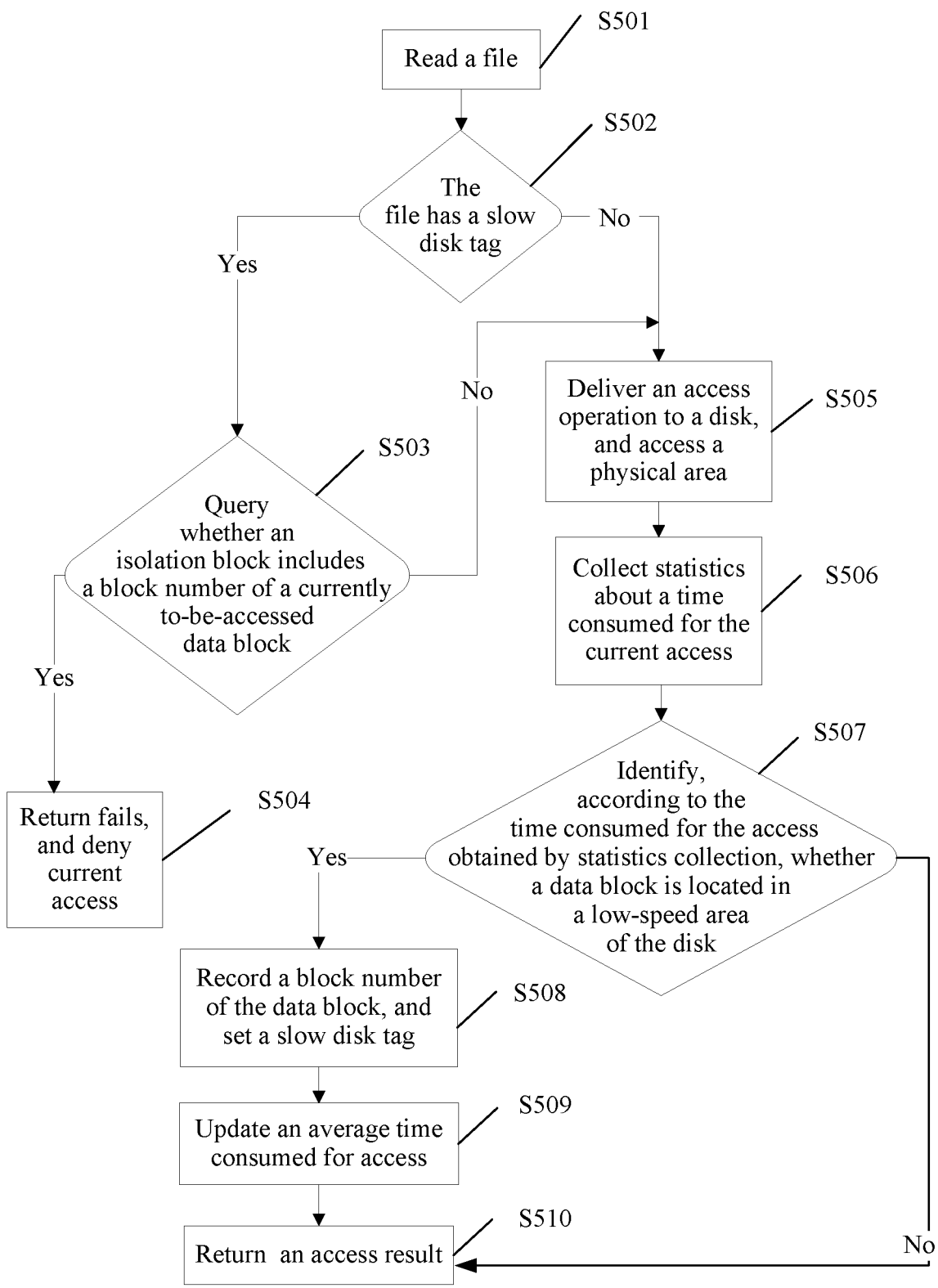
FIG. 5 is a flowchart of performing a file reading operation according to an embodiment of the present disclosure.

FIG. 5 is a flowchart of performing a file reading operation according to an embodiment of the present disclosure. As shown in FIG. 5, the procedure includes the following steps:

S501. An APP invokes an interface of a file system to send, to the file system, a request for access to a file.

The request carries an operation type, a file identifier, and a location of data for operation. The operation type carried in the request in this embodiment is a read operation.

S502. The file system determines a to-be-accessed data block of the to-be-accessed file; determines whether a slow disk tag is set in an index node of the to-be-accessed file; and if a slow disk tag is set, performs step S503; or if no slow disk tag is set, performs step S505.

Specifically, the file system may find the index node of the file according to the file identifier in the request. The index node records information about a data block occupied by the to-be-accessed file, such as a block number of the data block. The file system determines the to-be-accessed data block of the file according to a size of a data block and the data location carried in the request.

S503. The file system queries whether a block number of the currently to-be-accessed data block exists in an isolation block; and if the block number of the currently to-be-accessed data block exists in the isolation block, performs step S504 of denying the current access; or if the block number of the currently to-be-accessed data block does not exist in the isolation block, performs step S505.

S505. The file system accesses a physical area corresponding to the data block on a disk.

The file system translates the to-be-accessed data block into the corresponding physical area on the disk by using a universal block device, and delivers the access operation to a disk controller by using an I/O scheduling module to accesses the physical area though the disk controller.

S506. The file system collects statistics about a time consumed for currently accessing the physical area.

Step S506 may be implemented by using an existing statistics collection means, and details are not described herein.

S507. The file system identifies, according to the time consumed for access that is obtained by statistics collection, whether the data block is located in a low-speed area on the disk; and if the data block is located in the low-speed area on the disk, performs S508; or if the data block is not located in the low-speed area on the disk, performs S510.

For a specific identification algorithm, reference may be made to step S306. Details are not described herein again.

S508. The file system records the block number of the currently-accessed data block in the isolation block, and sets a slow disk tag in the index node of the file.

Specifically, the setting a slow disk tag may be that adding a flag bit as the slow disk tag to the index node; or may be that setting, by the file system, a tag bit, which is included in the index node and used as slow disk tag, to true.

S509. The file system updates a recorded average time consumed for accessing the disk and a quantity of times the disk is accessed.

S510. The file system returns an access result.

It should be noted that, a sequence for performing S508 and S509 is not limited in this embodiment of the present disclosure. Alternatively, S509 may be performed before S508 is performed.

Figure 6A:
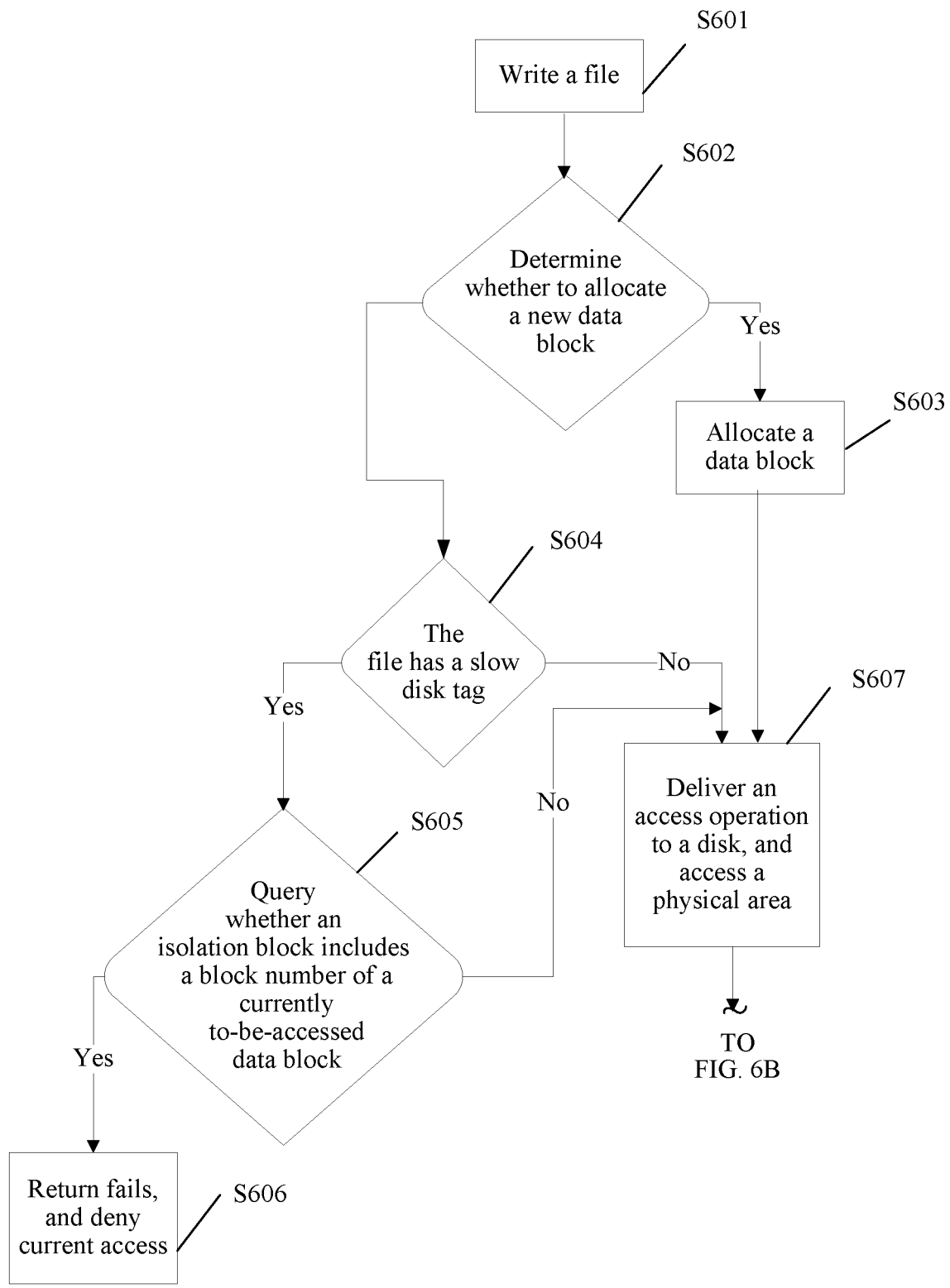
FIG. 6 (FIG. 6A, FIG. 6B) is a flowchart of performing a file writing operation according to an embodiment of the present disclosure.
Figure 6B:
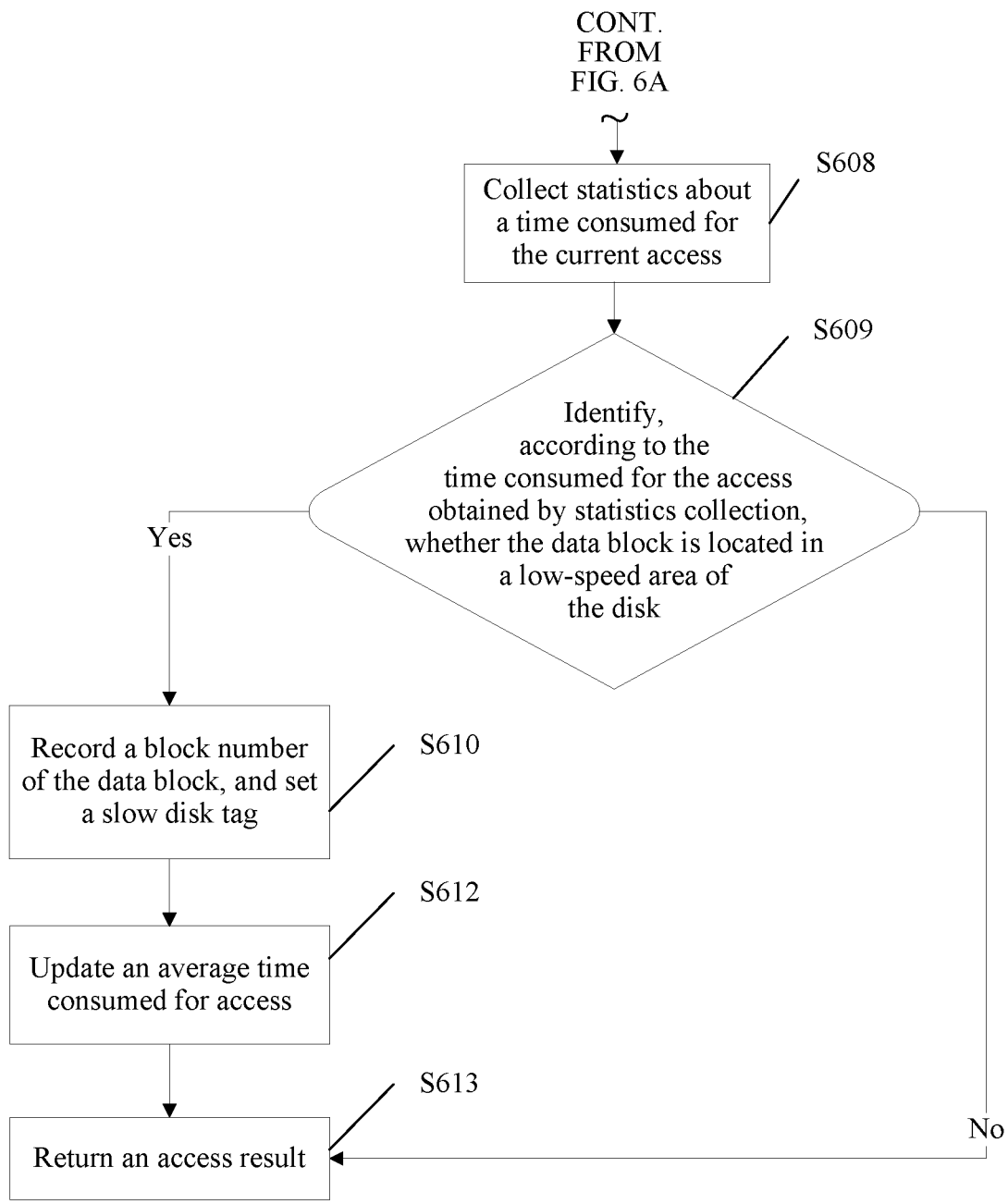

FIG. 6 (FIG. 6A and FIG. 6B) is a flowchart of performing a file writing operation according to an embodiment of the present disclosure. As shown in FIG. 6A and FIG. 6B, the procedure includes the following steps:

S601. An APP invokes an interface of a file system to send, to the file system, a request for access to a file.

The request may carry an operation type, a file identifier, and a location of data to be operated. The operation type carried in the request in this embodiment is a write operation.

S602. The file system determines whether a new data block needs to be allocated; and if a new data block needs to be allocated, performs S603; or if a new data block does not need to be allocated, performs S604.

S603. The file system allocates a new data block to the file with skipping an isolated data block; determines the new data block as a to-be-accessed data block; and continues to perform S607.

S604. The file system determines a to-be-accessed data block based on a write location in the file and a size of a data block; determines whether a slow disk tag is set in an index node of the to-be-accessed file; and if a slow disk tag is set, performs step S605; or if no slow disk tag is set, performs step S607.

Specifically, the file system may find the index node of the file according to the file identifier in the request. The index node records information about a data block occupied by the to-be-accessed file, such as a block number of the data block. The file system determines the to-be-accessed data block of the file according to the size of the data block and the data area carried in the request.

S605. The file system determines whether the to-be-accessed data block is already isolated; and if the data block is already isolated, performs S606 of denying the current access; or if the data block is not isolated, performs S607.

The file system queries whether a block number of the currently to-be-accessed data block exists in an isolation block, and if the block number of the currently to-be-accessed data block exists in the isolation block, the currently to-be-accessed data block is already isolated, or if the block number of the currently to-be-accessed data block does not exist in the isolation block, the currently to-be-accessed data block is not isolated.

S607. The file system accesses a physical area corresponding to the data block on a disk, and then continues to perform S608 to S613.

A process of processing steps S608 to S613 is similar to that of processing steps S506 to S510, and details are not described herein again.

In this embodiment of the present disclosure, a data block is isolated in a file system, which avoids access to an area with low performance on a disk, and does not affect access to an area with normal performance on the disk, thereby reducing an isolation granularity and increasing a utilization rate of the disk.

In addition, because disk area isolation is implemented in the file system in this embodiment of the present disclosure, a request for access to a low-speed disk area can be directly denied at a file system layer, thereby preventing the request for the access to the low-speed disk area being delivered to a disk controller again, and saving system resources.

Further, in this embodiment of the present disclosure, a disk detection algorithm is optimized, thereby improving detection accuracy.

Figure 7:
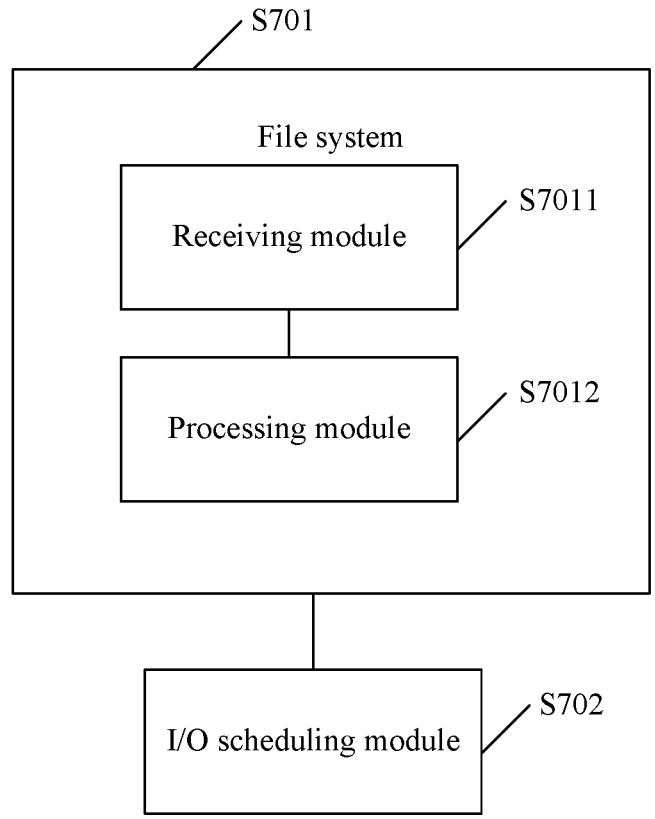
FIG. 7 is a schematic structural diagram of a disk area isolation device according to an embodiment of the present disclosure.

FIG. 7 is a schematic structural diagram of a disk area isolation device according to an embodiment of the present disclosure. The device includes a file system 701, the file system stores a file in a unit of data block, the data block is a logical block partitioned by the file system on a disk, each data block has a corresponding physical area on the disk, and the file system specifically includes:

a receiving module 7011, configured to receive a request for access to a file, where the access includes file reading or file writing; and a processing module 7012, configured to: determine a to-be-accessed data block according to the request; access a physical area corresponding to the data block on the disk; identify, according to a time consumed for accessing the physical area, whether the data block is located in a low-speed area on the disk; and isolate the data block that is identified to be located in the low-speed area.

The receiving module 7011 may be an externally open interface of the file system, and may receive invoking of an APP or receive access of a user.

In this embodiment of the present disclosure, a data block is isolated in a file system, which avoids access to an area with low performance on a disk, and does not affect access to an area with normal performance on the disk, thereby reducing an isolation granularity and increasing a utilization rate of the disk.

The processing module 7012 may implement a disk detection function by using an existing disk detection algorithm, or may implement a disk detection function by using an improved algorithm provided in this embodiment of the present disclosure. When using the improved algorithm provided in this embodiment of the present disclosure, the processing module 7012 is further configured to record an average time consumed for accessing the disk.

That the processing module 7012 identifies, according to the time consumed for accessing the physical area, whether the data block is located in the low-speed area on the disk specifically includes:

the processing module 7012 is configured to: acquire the recorded average time consumed for accessing the disk; calculate a ratio of the time consumed for accessing the physical area to the average time consumed for accessing the disk; and compare the ratio with a time consumption threshold preset in the file system, where if the ratio is greater than the time consumption threshold, the data block is located in the low-speed area on the disk; or if the ratio is less than the time consumption threshold, the data block is not located in the low-speed area on the disk.

It should be noted that, when the determined data block is not located in the low-speed area on the disk, the processing module 7012 is further configured to update the recorded average time consumed for accessing the disk.

A quantity of times the disk is accessed needs to be used in an updating algorithm. Therefore, the processing module 7012 is further configured to record the quantity of times the disk is accessed. That the processing module 7012 updates the recorded average time consumed for accessing the disk specifically includes:

calculating, by the processing module 7012 by using a formula acctme(new)=(acctime(sb)*ion(sb)+acctime(file block))/(ion(sb)+1), an average time consumed for accessing the disk, where acctme(new) is the latest average time consumed for accessing the disk that is obtained by means of calculation, acctime(sb) is the average time consumed for accessing the disk that is recorded in the file system, ion(sb) is the quantity of times the disk is accessed that is recorded in the file system, and acctime(file block) is the time consumed for currently accessing the physical area; and updating, by the processing module 7012, the recorded average time consumed for accessing the disk to the average time consumed for accessing the disk that is obtained by means of calculation.

It should be noted that, the quantity of access times that is recorded in the file system may be in real time, or may be a preset fixed value. For example, if situations of only last 10 times of access are considered during calculation of the average time consumed for accessing the disk, the quantity of times the disk is accessed may be set to nine. If the quantity of access times is in real time, each time the average time consumed for accessing the disk is updated, the processing module 7012 is further configured to increase the recorded quantity of times the disk is accessed by one, so that the quantity of times the disk is accessed is used next time in calculation of the average time consumed for accessing the disk.

The file system is used to organize and manage data storage in disk space. Therefore, the file system may include a data structure that is used to describe logical partitioning of the disk, and the data structure includes an isolation block and a data area.

The isolation block is used to record a block number of an isolated data block.

The data area includes a data block used for file storage.

The isolation block is a new logical block in the data structure in this embodiment of the present disclosure. An area size of the isolation block may be specified by the user or may be automatically obtained by means of calculation according to a total size of the disk space. For example, the size of the isolation block can be automatically obtained by means of calculation by using the following algorithm: (size(fs)/size(block))*p/8, and the isolation block in this embodiment is managed by using a bitmap, where size(fs) is a total size of the file system, size(block) is a size of a data block, p is a data block isolation rate (a value of p may be set to 5% by default), and one byte includes 8 bits. Therefore, the size of the isolation block that is obtained by means of calculation by using the foregoing algorithm is in a unit of byte.

Based on the foregoing data structure, that the processing module 7012 isolates the data block that is identified to be located in the low-speed area specifically includes: recording, by the processing module 7012 in the isolation block, a block number of the data block that is identified to be located in the low-speed area; after subsequent access to the data block is received, determining whether the isolation block records the block number of the data block; and after determining that the isolation block already records the block number of the data block, denying the subsequent access to the data block.

Optionally, the foregoing data structure may further include a metadata area. The metadata area includes an index node that is used for recording metadata in a file, where each file is corresponding to one index node.

That the processing module 7012 isolates the data block that is identified to be located in the low-speed area further includes: setting, by the processing module 7012, a slow disk tag in an index node of the file, where the slow disk tag is used to indicate that the file occupies the data block that is located in the low-speed area on the disk.

Before determining whether the isolation block records the block number of the data block, the processing module 7012 further determines that the slow disk tag is set in the index node of the file.

The foregoing data structure may further include a superblock. The superblock may record the average time consumed for accessing the disk and the quantity of times the disk is accessed, and the superblock is further used to record start addresses of the isolation block, the data area, and the metadata area, and a size of a data block.

The access to the file in the foregoing embodiment may be a file reading operation or a file writing operation. During file writing, whether new disk space is allocated is involved. Therefore, for file reading and file writing, processing by the processing module 7012 is different.

Specifically, when the access is file reading, that the processing module 7012 determines the to-be-accessed data block according to the request specifically includes: determining, by the processing module 7012, the to-be-accessed data block based on a location of to-be-read data in the file and the size of the data block.

When the access is file reading, that the processing module 7012 determines the to-be-accessed data block according to the request specifically includes:

determining, by the processing module 7012 according to the request, whether a new data block needs to be allocated; and if a new data block needs to be allocated, allocating, by the file system, a new data block to the file with skipping the isolated data block, and determining the new data block as the to-be-accessed data block; or if a new data block does not need to be allocated, determining, by the processing module, the to-be-accessed data block based on a write location in the file.

Further, the device shown in FIG. 7 may further include an I/O scheduling module 702. The I/O scheduling module 702 is configured to schedule an access operation of accessing a physical area on the disk. That is, the processing module 7012 in the file system 701 may access, by using the I/O scheduling module, a physical area corresponding to a data block on the disk.

For specific implementation of various functions of the file system in the embodiment shown in FIG. 7, reference may be made to the method embodiments. For the data structure used in the file system, reference may be made to FIG. 4. Details are not described herein again.

Figure 8:
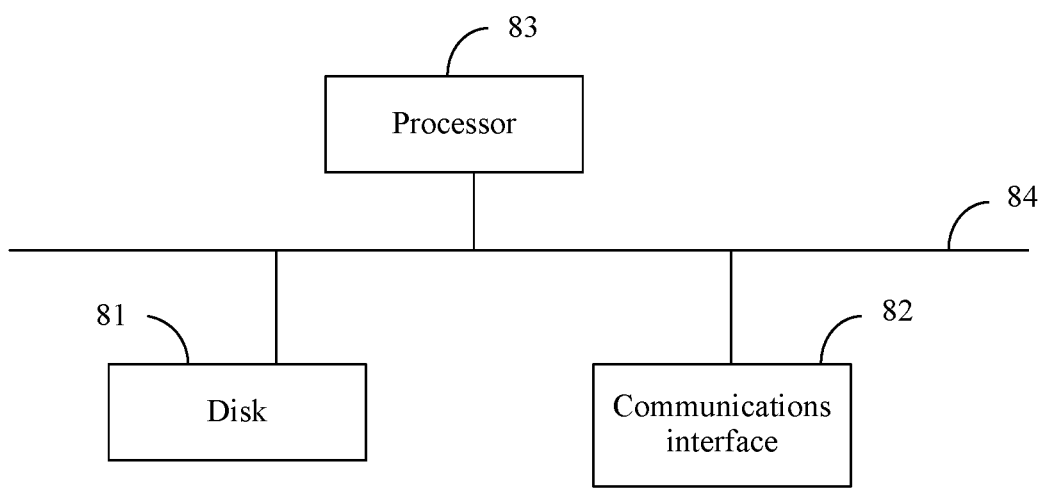
FIG. 8 is a schematic structural diagram of hardware of a disk area isolation device according to an embodiment of the present disclosure.

FIG. 8 is a structural diagram of hardware of a disk area isolation device according to an embodiment of the present disclosure. As shown in FIG. 8, the device includes a disk 81, a communications interface 82, a processor 83, and a bus 84.

The processor 83, the disk 81, and the communications interface 82 are communicatively connected by using the bus 84.

The communications interface 82 is configured to implement communication between a terminal and another device or a communications network (which is not limited to, for example, a PLMN/PSTN and the Internet). In this embodiment of the present disclosure, a file system may receive, by using the communications interface 82, an external access to a file.

The disk 81 may be a storage medium such as a hard disk. The disk 81 may store instructions and application data of an operating system and another application program. In this embodiment of the present disclosure, the disk 81 stores data of the file system.

The processor 83 may use a general-purpose central processing unit (CPU), a microprocessor, an application-specific integrated circuit (ASIC), or one or more integrated circuits to run a related program.

The bus 84 may include a path for transmitting information between all components (such as the processor 83, the disk 81, and the communications interface 82).

In this embodiment of the present disclosure, the processor 83 is configured to run the file system of the disk 81 to implement the following functions: receiving a request for access to a file, where the access includes file reading or file writing; determining a to-be-accessed data block according to the request; accessing a physical area corresponding to the data block on the disk; identifying, according to a time consumed for accessing the physical area, whether the data block is located in a low-speed area on the disk; isolating the data block that is identified to be located in the low-speed area; and after the data block is isolated, denying subsequent access to the data block.

For a specific processing process of the processor 83, reference may be made to the method embodiments shown in FIG. 3 to FIG. 6B. Details are not described herein again.

By using descriptions in the foregoing embodiments, a person of ordinary skill in the art may understand that all or some of the steps of the methods in the foregoing embodiments may be implemented by a program instructing relevant hardware. The program may be stored in a computer readable storage medium. When the program runs, the steps of the foregoing method embodiments are included. The storage medium may be, for example, an ROM/RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A disk area isolation method, wherein the method is applied to a file system, the file system stores a file in a unit of data block, each data block has a corresponding physical area on a disk, and the method comprises:
   receiving, by the file system, a request for access to a file, wherein the access comprises file reading or file writing, wherein the file system comprises a data structure that is used to describe logical partitioning of the disk, and the data structure comprises an isolation block and a data area, wherein the isolation block is used to record a block number of an isolated data block; and the data area comprises a data block used for file storage;
   determining a to-be-accessed data block according to the request;
   accessing a physical area corresponding to the data block on the disk;
   acquiring a recorded average time consumed for accessing the disk;
   calculating a ratio of time consumed for accessing the physical area to the average time consumed for accessing the disk;
   comparing the ratio with a time consumption threshold preset in the file system, wherein if the ratio is greater than the time consumption threshold, the data block is located in the low-speed area on the disk, or if the ratio is less than the time consumption threshold, the data block is not located in the low-speed area on the disk;
   recording, by the file system in the isolation block, a block number of the data block that is identified to be located in the low-speed area;
   after subsequent access to the data block is received, determining whether the isolation block records the block number of the data block; and
   after determining that the isolation block already records the block number of the data block, denying the subsequent access to the data block.

2. The method according to claim 1, further comprising:
   when the data block is not located in the low-speed area on the disk, updating, by the file system, the recorded average time consumed for accessing the disk.

3. The method according to claim 2, wherein the file system further records a quantity of times the disk is accessed;
   wherein the updating the recorded average time consumed for accessing the disk comprises:
   calculating, by using a formula $acctme(new)=(acctime(sb)*ion(sb)+acctime(file\ block))/(ion(sb)+1)$, an average time consumed for accessing the disk, wherein acctme(new) is the latest average time consumed for accessing the disk that is obtained by means of calculation, acctime(sb) is the average time consumed for accessing the disk that is recorded in the file system, ion(sb) is the quantity of times the disk is accessed that is recorded in the file system, and acctime(file block) is the time consumed for currently accessing the physical area; and
   updating, by the file system, the recorded average time consumed for accessing the disk to the average time consumed for accessing the disk that is obtained by means of calculation; and
   wherein the method further comprises: each time the average time consumed for accessing the disk is updated, increasing, by the file system, the quantity of times the disk is accessed by one.

4. The method according to claim 1, wherein the data structure further comprises a metadata area, wherein:
   the metadata area comprises an index node that is used for recording metadata of a file, wherein each file is corresponding to one index node; and
   the isolating the data block that is identified to be located in the low-speed area further comprises:
   setting a slow disk tag in an index node of the file, wherein the slow disk tag is used to indicate that the file occupies the data block that is located in the low-speed area on the disk; and
   before the determining whether the isolation block records the block number of the data block, the method further comprises:
   determining that the slow disk tag is set in the index node of the file.

5. The method according to claim 1, wherein the data structure further comprises a superblock, wherein:
   the superblock records the average time consumed for accessing the disk and the quantity of times the disk is accessed, and the superblock further records start addresses of the isolation block, the data area, and the metadata area, and a size of a data block.

6. The method according to claim 1, wherein when the access is file reading, the determining the to-be-accessed data block comprises: determining, by the file system, the to-be-accessed data block based on a location of to-be-read data in the file and the size of the data block.

7. The method according to claim 1, wherein when the access is file writing, the determining the to-be-accessed data block comprises:
   determining, by the file system according to the request, whether a new data block needs to be allocated; and
   if a new data block needs to be allocated, allocating, by the file system, a new data block to the file with skipping the isolated data block, and determining the new data block as the to-be-accessed data block; or
   if a new data block does not need to be allocated, determining, by the file system, the to-be-accessed data block based on a write location in the file and the size of the data block.

8. A disk area isolation device, comprising:
   a memory storing instructions of a file system; and
   a processor coupled to the memory to execute the instructions of the file system to:
   receive a request for access to a file, wherein the access comprises file reading or file writing,
   wherein the file system comprises a data structure that is used to describe logical partitioning of the disk, and the data structure comprises an isolation block and a data area,
   wherein the isolation block is used to record a block number of an isolated data block and the data area comprises a data block used for file storage:
   determine a to-be-accessed data block according to the request;
   access a physical area corresponding to the data block on the disk; acquire a recorded average time consumed for accessing the disk; calculate a ratio of time consumed for accessing the physical area to the average time consumed for accessing the disk;
   compare the ratio with a time consumption threshold preset in the file system, wherein if the ratio is greater than the time consumption threshold, the data block is located in the low-speed area on the disk, or if the ratio is less than the time consumption threshold, the data block is not located in the low-speed area on the disk;
   record, in the isolation block, a block number of the data block that is identified to be located in the low-speed area;
   after subsequent access to the data block is received, determine whether the isolation block records the block number of the data block; and
   after determining that the isolation block already records the block number of the data block, denying the subsequent access to the data block.

9. The device according to claim 8, wherein the processor is further configured to: when the data block is not located in the low-speed area on the disk, update the recorded average time consumed for accessing the disk.

10. The device according to claim 9, wherein the processor is further configured to record a quantity of times the disk is accessed;

wherein the processor updates the recorded average time consumed for accessing the disk comprises:
   calculating, by the processing module by using a formula $acctme(new)=(acctime(sb)*ion(sb)+acctime(file block))/(ion(sb)+1)$, an average time consumed for accessing the disk, wherein acctme(new) is the latest average time consumed for accessing the disk that is obtained by means of calculation, acctime(sb) is the average time consumed for accessing the disk that is recorded in the file system, ion(sb) is the quantity of times the disk is accessed that is recorded in the file system, and cctime(file block) is the time consumed for currently accessing the physical area; and updating, by the processing module, the recorded average time consumed for accessing the disk to the average time consumed for accessing the disk that is obtained by means of calculation; and
   wherein the processor is further configured to: each time the average time consumed for accessing the disk is updated, increase the quantity of times the disk is accessed by one.

11. The device according to claim 8, wherein the data structure further comprises a metadata area, and wherein:
   the metadata area comprises an index node that is used for recording metadata in a file, wherein each file is corresponding to one index node;
   the processor isolates the data block further comprises: setting a slow disk tag in an index node of the file, wherein the slow disk tag is used to indicate that the file occupies the data block that is located in the low-speed area on the disk; and
   before that the processor determines whether the isolation block records the block number of the data block, the processor determines that the slow disk tag is set in the index node of the file.

12. The device according to claim 8, wherein the data structure further comprises a superblock, wherein
   the superblock records the average time consumed for accessing the disk and the quantity of times the disk is accessed, and the superblock further records start addresses of the isolation block, the data area, and the metadata area, and a size of a data block.

13. The device according to claim 8, wherein when the access is file reading, the processor determines the to-be-accessed data block comprises: determining, by the processor, the to-be-accessed data block based on a location of to-be-read data in the file.

14. The device according to claim 8, wherein when the access is file writing, the processor determines the to-be-accessed data block comprises:
   determining, by the processor according to the request, whether a new data block needs to be allocated; and if a new data block needs to be allocated, allocating, by the processor, a new data block to the file with skipping the isolated data block, and determining the new data block as the to-be-accessed data block; or if a new data block does not need to be allocated, determining, by the processing module, the to-be-accessed data block based on a write location in the file.

* * * * *